Aug. 4, 1953
C. M. PERKINS
2,648,041
ALTITUDE SENSOR
Filed Nov. 28, 1950
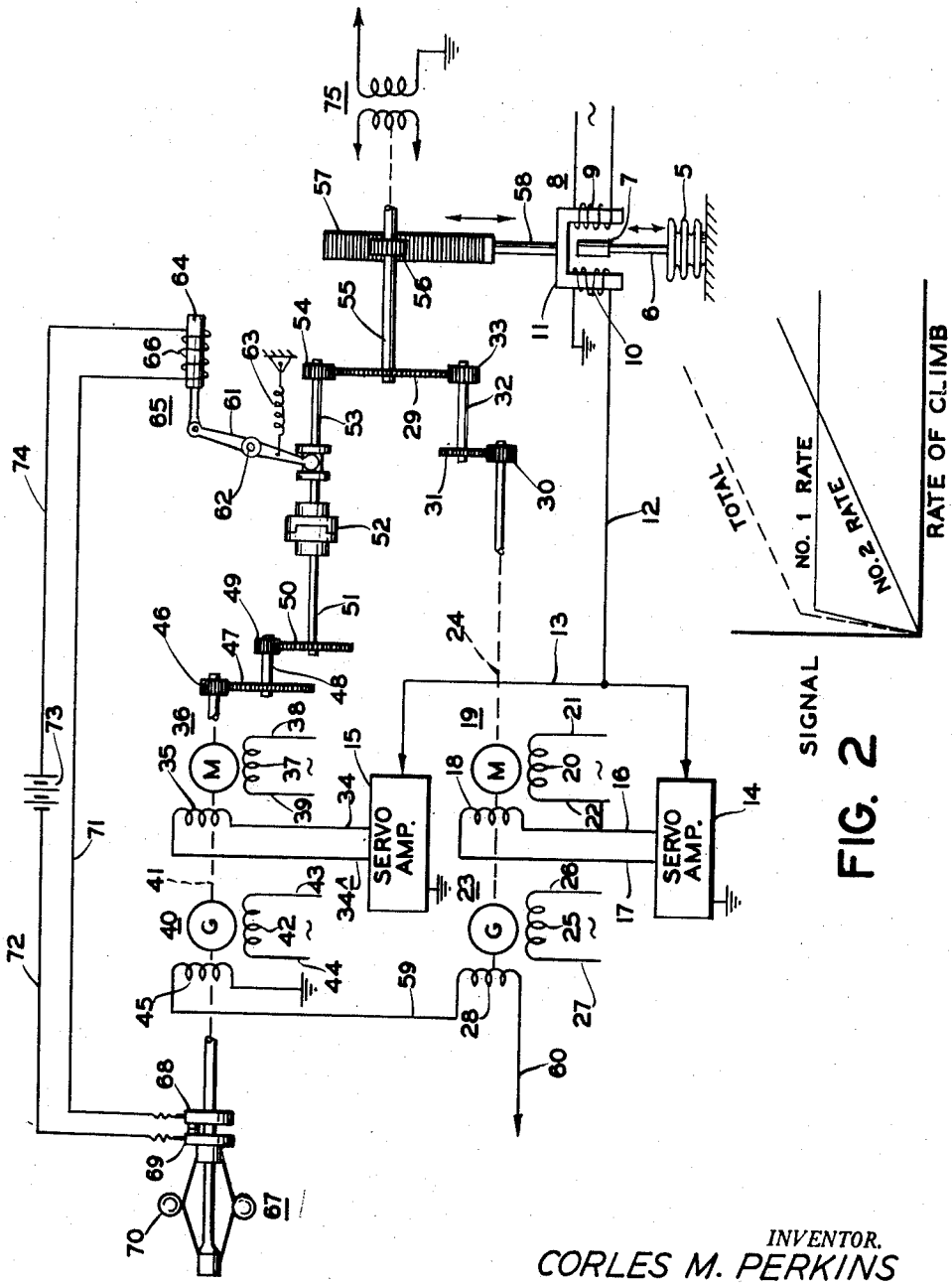
INVENTOR.
CORLES M. PERKINS
BY
*James M. Nickels*
ATTORNEY Patented Aug. 4, 1953

2,648,041

UNITED STATES PATENT OFFICE 2,648,041

ALTITUDE SENSOR

Corles M. Perkins, Rutherford, N. J., assignor to Bendix Aviation Corporation, Teterboro, N. J., a corporation of Delaware Application November 28, 1950, Serial No. 197,991

14 Claims. (Cl. 318—481)

The present invention relates to auto pilots and more particularly to a rate of climb altitude sensor for use in an auto pilot.

The altitude sensor in an auto pilot has several functions, one of which is to put out a signal which is a measure of rate of climb. In present day aircraft, the range of the rate of climb is from fifty feet per minute to rates in the thousands of feet per minute. This wide range of rate of climb presents a problem to find means that will accurately measure the rate of climb through the range. The large dynamic range required is greater than that which can be handled by the conventional servo means using an aneroid to detect altitude, a linear inductive pick-off to detect movement and position of the aneroid, a motor responsive to the pick-off signal to drive the pick-off through a gear train to the null position and a rate generator to read the speed of the motor indicative of the rate of climb.

A low inertia motor of the type adapted for use in the aforenoted system can be controlled to a minimum speed of 100 R. P. M. and the maximum speed may be as high as 9000 R. P. M. This will provide a dynamic range of 90 to 1 which falls far short of meeting the desired range. To increase the maximum speed of the motor would also increase the minimum controllable speed of the motor. Loading the motor would lower the controllable minimum speed but would not improve the range beyond 200 to 1.

Other arrangements have proven unsatisfactory in that they failed to provide the required range, were unstable or mechanically and electrically too complicated to be practical.

It is an object of the present invention to overcome the aforenoted disadvantages and objections by providing an improved system whereby two motors, essentially identical and each provided with a rate generator, are connected through separate gear trains to drive the linear take-off to null. One of the gear trains has a high reduction and enables the motor attached thereto to take over the control for low rates of climb. Upon the rate exceeding a predetermined maximum, the motor and high reduction gearing are disconnected and the other motor takes over.

Another object of the invention is to provide a two speed altitude sensor.

The above and other objects and features of the invention will appear more fully hereinafter from a consideration of the following description taken in connection with the accompanying drawing wherein one embodiment of the invention is illustrated by way of example.

In the drawing:

Figure 1 is a diagrammatic showing of an altitude sensing system embodying the invention.

Figure 2 is a drawing illustrating graphically the operation of the invention.

Referring now to Figure 1, a pressure responsive device 5 is mounted with one end fixed and is responsive to pressure change. The other end is connected by a rod 6 to a core 7 of a linear inductive pick-off transformer 8. The transformer 8 has a primary winding 9 and secondary winding 10 on pole piece 11. The primary winding 9 is connected to a suitable source of alternating current (not shown). The secondary winding 10 is made up of two sections wound in opposition to each other. The phase and magnitude of the output of the transformer 8 is determined by the position of the core 7 relative to the winding 10. The output will be zero when the core 7 extends an equal distance across the two sections of the winding 10 in the null position.

One end of the winding 10 is connected to ground and the other end is connected by conductors 12 and 13 to the inputs of amplifiers 14 and 15. The output of amplifier 14 is connected by conductors 16 and 17 across signal winding 18 of a motor 19.

The motor 19 has an excitation winding 20 connected by conductors 21 and 22 to a suitable source of alternating current (not shown). The direction of rotation of the motor 19 is dependent upon the phase and magnitude of the current in the signal winding 18.

A rate generator 23 is attached to armature shaft 24 of the motor 19. The rate generator 23 has an excitation winding 25 connected by conductors 26 and 27 to a suitable alternating current source (not shown) and a signal winding 28. The armature shaft 24 is connected to a pinion gear 29 through gears 30, 31, shaft 32 and gear 33.

In like manner, the output of the amplifier 15 is connected by conductors 34 and 34A to signal winding 35 of a motor 36. The motor 36 has an excitation winding 37 connected by conductors 38 and 39 to a suitable alternating current source (not shown). A rate generator 40 is attached to armature shaft 41 of the motor 36. The generator 40 has an excitation winding 42 connected by conductors 43 and 44 to a suitable source of alternating current (not shown) and a signal or output winding 45.

The armature shaft 41 is connected to the pinion gear 29 through gears 46, 47, shaft 48, gears 49, 50, shaft 51, clutch 52, shaft 53 and gear 54. The pinion gear 29 is connected by shaft 55 and gear 56 to rack gear 57. The rack gear 57 is connected by a rod 58 to the pole piece 11 of the transformer 8.

One end of the winding 45 of the generator 40 is connected to ground. The other end of the winding 45 is connected by a conductor 59 to one end of the winding 28 of the generator 23. The other end of the winding 28 is connected to the rate of climb output signal conductor 60.

The clutch 52 connects the shafts 51 and 53 and is actuated by a lever 61 pivoted at 62. The clutch 52 is normally biased in a disengaged position by spring 63. Connected to the end of the lever 61 is an armature 64 of a solenoid 65. The solenoid 65 has a control winding 66. Energization of the winding 66 is controlled by a centrifugal switch 67 connected to the rotor shaft 41 of the motor 36. The switch 67 is illustrated as having a fixed contact 68 and a movable contact 69. The movable contact 69 is actuated by ball means 70 responsive to a predetermined speed to actuate the movable contact 69 to an open circuit position. The stationary contact is connected by a conductor 71 to one end of the winding 66. The movable contact 69 is connected by a conductor 72 to one terminal of a D. C. source illustrated as a battery 73. The other terminal of the battery 73 is connected by a conductor 74 to the other end of the winding 66. The solenoid 66 when energized, overcomes the bias of the spring 63 and actuates the clutch 52 to an engaged position.

The shaft 55 may also drive an inductive altitude signal developing device indicated generally by the numeral 75 or any other control or indicating equipment conventionally used in connection with altitude displacement.

In operation, the motors 19 and 36 are substantially identical. The gear reduction from the motor 36 is such that a maximum rate of synchronization of, for example, 3500 feet per minute may be obtained. The motor 19 is geared so that a maximum rate of synchronization of ten or more times the rate for motor 36 may be obtained. At low speeds, the motors 19 and 36 are operating on the low torque range of the output curves, hence the motor 36 with the larger gear reduction will be effective in driving the pick-off 8 to null. The motor 19 due to the high gear ratio will have insufficient torque to drive the pinion gear 29 faster than it is being driven by the motor 36 and consequently will be operating at a somewhat lower speed than the motor 36. For the example given, the motor 36 will have a maximum rate of synchronization of 60,000 feet per minute and so will be running approximately 17 times faster than the motor 19. Thus when the altitude is changing slowly, the motor 36 with the larger reduction gearing will be effective in driving the pick-off 8 to null. As the rate of climb increases, the motor 36 will gradually approach maximum speed. At a predetermined point just below maximum speed, the centrifugal switch 67 will deenergize the solenoid 65 and the spring 63 will disengage the clutch 52. The motor 36 will continue to run at the maximum speed, but will no longer be effective in driving the pick-off 8 to null. The motor 19, however, will continue to drive the pick-off to null, and will be able to carry the unit up to rates of thousands of feet per minute. As the rate of climb diminishes to within the speed range of the motor 36, the centrifugal switch 62 will close the contacts 68, 69 causing the solenoid 65 to actuate the clutch 52 to engage the shaft 51 whereby the motor 36 will again take over.

The output curve of volts vs. rate of climb will be the sum of the output of the rate generators 23 and 40 as the output windings 28 and 45 are connected in series. See Figure 2. For rates of climb up to, for example, 3500 feet per minute the curve will have a relatively steep slope, above that where the rate generator 28 on the motor 19 only is adding to the output, the slope will be smaller. Upon reaching 3500 feet per minute the output of the rate generator 45 will remain constant. Thus, at low rates of climb, the sensitivity is greater than for the high rates of climb.

Although only one embodiment of the invention has been illustrated and described, various changes in the form and relative arrangement of the parts, which will now appear to those skilled in the art, may be made without departing from the scope of the invention.

I claim:

1. Apparatus for determining the rate of change of altitude of a high speed aircraft adapted for traversing a wide range of altitude levels, comprising means having a wall movable in one direction in response to craft ascent and movable in another direction in response to craft descent, normally balanced means which, when unbalanced, develop a signal corresponding to the amount of its unbalance, said wall being adapted to unbalance said normally balanced means, a pair of driving means operative by said signal, common means connecting said driving means to re-balance said normally balanced means when the latter is unbalanced, means driven by one of said driving means for developing a signal corresponding to the rate of operation of the last-named driving means, means responsive to a predetermined rate of wall movement for making the first driving means inoperative over the re-balancing means, said second driving means assuming primary control of said re-balancing means, and means driven by the second driving means for developing a rate signal corresponding to the speed of operation of said second driving means.

2. Apparatus for determining the amount of altitude change for a high speed aircraft adapted for traversing a wide range of altitude levels, comprising means having a wall movable in one direction in response to craft ascent and movable in another direction in response to craft descent, normally balanced means which, when unbalanced, develop a signal corresponding to the amount of its unbalance, said wall being adapted to unbalance said normally balanced means, a pair of driving means operative by said signal, common means connecting said driving means to re-balance said normally balanced means when the latter is unbalanced, means adapted to be driven by said common means to give a signal corresponding to the position of said normally balanced means, means responsive to a predetermined rate of wall movement for making one of said driving means inoperative over the re-balancing means, said other driving means assuming control of said rebalancing means, said position signal having a high degree of sensitivity when driven by both of said driving means and a lesser degree of sensitivity when driven by said last named driving means.

3. Apparatus for determining the rate of change of altitude of a high speed aircraft adapted for traversing a wide range of altitude levels, comprising means having a wall movable in one direction in response to craft ascent and movable in another direction in response to craft descent, normally balanced means which, when unbalanced develop a signal of phase and magnitude corresponding to the rate and direction of unbalance, a pair of motors operative by said signal, one of said motors being connected through high reduction gearing to re-balance said normally balanced means when the latter is unbalanced, the other of said motors being connected through low reduction gearing to rebalance said normally balanced means when the latter is unbalanced, said first named motor being adapted to assume primary control of said rebalancing means below a predetermined rate of wall movement, means responsive to said predetermined rate for making said first motor inoperative over the rebalancing means, said second motor assuming control of said re-balancing means, and means for developing a rate signal corresponding to the speed of operation of both of said motors.

4. Apparatus for determining the amount of altitude change and rate of altitude change of a high speed aircraft traversing a wide range of altitude levels, comprising means having a wall movable in one direction in response to craft ascent and movable in another direction in response to craft descent, normally balanced means, which, when unbalanced, develop a signal corresponding to the amount of its unbalance, said wall being adapted to unbalance said normally balanced means, a pair of driving means operative by said signal, said driving means having different output ratios, common means connecting said driving means to re-balance said normally balanced means when the latter is unbalanced, means responsive to a predetermined rate of wall movement for making one of said driving means inoperative over the re-balancing means, the other of said driving means assuming control of said rebalancing means, means driven by said driving means for developing a rate signal corresponding to the speeds of operation of said driving means, and means driven by said common means for developing a signal corresponding to the position of said re-balancing means.

5. Apparatus for determining the rate of change of a high speed aircraft adapted for traversing a wide range of altitude levels, comprising means having a member movable in one direction in response to craft ascent and movable in another direction in response to craft descent, normally balanced means which, when unbalanced, develop a signal corresponding to the amount of its unbalance, said member being adapted to unbalance said normally balanced means, driving means responsive to said signal to re-balance said normally balanced means, said driving means including gearing adapted to balance said re-balancing means at one gear ratio for signals below a predetermined rate of member movement and at a different gear ratio for signals above said predetermined rate of member movement, and means driven by said driving means for developing a rate signal corresponding to the speed of operation of said driving means.

6. An altitude sensor for providing an indication of rate of climb comprising pressure responsive means, an inductive pick-off responsive to movement and position of said pressure responsive means, an inductive pick-off responsive to put of said pick-off, a relatively high reduction gear train for connecting said first motor to said pick-off, a second motor responsive to the output of said pick-off, a relatively low reduction gear train for connecting said second motor to said pick-off, said motors having low torque at low speeds, said first motor and high reduction gear train being adapted to drive said pick-off to a null position for low rates of climb, means for disconnecting said high reduction gear train from said pick-off upon said first motor reaching a predetermined maximum speed, said second motor being adapted to drive said pick-off to a null position for rates of climb above said predetermined maximum, and means for deriving a signal corresponding to the speeds of said motors.

7. A rate of climb sensing device comprising an altitude pressure responsive device, an inductive pick-off transformer responsive to movement and position of said pressure device, a pair of motors responsive to the output of said transformer to drive said transformer to a null position, one of said motors having a relatively high reduction gearing and adapted to be effective in driving said transformer to null position for low rates of climb, centrifugal means for disconnecting said motor and high reduction gearing from driving said transformer upon said motor reaching a predetermined maximum speed, said other motor becoming effective for driving said transformer to a null position for high rates of climb and means for deriving a rate signal from both of said motors.

8. A two speed altitude sensor comprising a pressure responsive device for detecting altitude, inductive means for producing a signal of magnitude and phase dependent upon movement and position of said pressure responsive device, dual driving means responsive to the output signal of said inductive means for driving said inductive means to a null position, one of said driving means being adapted to drive said inductive means for low rates of climb, the other of said driving means being adapted to drive said inductive means at high rates of climb, means responsive to a predetermined rate of climb to disconnect said first named driving means from said inductive means, and means responsive to the combined rates of said driving means to derive a signal proportional to the speed of said driving means.

9. Apparatus for deriving a signal indicative of the rate of change of altitude of a high speed aircraft traversing a wide range of altitude levels, comprising means having a wall movable in one direction in response to craft ascent and in another direction in response to craft descent, means operative by the wall for developing a control signal corresponding to wall movement, motor driven means responsive to said control signal for developing a signal indicative of the rate of change of altitude, said signal having a relatively steep slope for low rates of wall movement and a lesser slope for high rates of wall movement.

10. Apparatus for determining the rate of change of altitude and altitude of a high speed aircraft adapted for traversing a wide range of altitude levels, comprising means having a wall movable in one direction in response to craft ascent and movable in another direction in response to craft descent, normally balanced means which, when unbalanced, develop a signal corresponding to the amount of its unbalance, said wall being adapted to unbalance said normally balanced means, a pair of driving means operative by said signal, common means connecting said driving means to re-balance said normally balanced means when the latter is unbalanced, means also driven by said common means for developing a signal corresponding to the operation of said common means to indicate the change of altitude, means driven by one of said driving means for developing a signal corresponding to the rate of operation of the last-named driving means, and means responsive to a predetermined rate of wall movement for making the first driving means inoperative over the re-balancing means, said second driving means assuming primary control of said re-balancing means, and means driven by the second driving means for developing a rate signal corresponding to the speed of operation of said second driving means.

11. Apparatus for determining the change of altitude of a high speed aircraft adapted for traversing a wide range of altitude levels, comprising means having a wall movable in one direction in response to craft ascent and movable in another direction in response to craft descent, normally balanced means which, when unbalanced, develop a signal corresponding to the amount of its unbalance, said wall being adapted to unbalance said normally balanced means, a pair of driving means operative by said signal, common means connecting said driving means to re-balance said normally balanced means when the latter is unbalanced, means also driven by said common means for developing a signal corresponding to the operation of said common means to indicate the change of altitude, and means responsive to a predetermined rate of wall movement for making the first driving means inoperative over the re-balancing means, said second driving means assuming primary control of said re-balancing means.

12. Apparatus for developing a signal indicative of a rate of change in condition, comprising a two part device having a first part movable from a null position relative to a second part in response to change in condition for developing a signal, means responsive to said signal for driving the second part relative to the first part to re-establish said null position, said driving means including a plurality of means for driving said second part to the null position at different rates, means responsive to said driving rate for rendering selective drives ineffective, and means operated by said driving means for developing a signal whereby the latter signal is the rate of change of null position and indicative of a rate of change of condition.

13. In a null seeking system, a plurality of motors, means displaceable from a predetermined position to provide a source of control energy for said motors, means connecting said motors and said displaceable means for returning said displaceable means to said predetermined position for cancelling said control energy, said connecting means including means for returning said displaceable means to a predetermined position at a fast rate and means for returning said displaceable means to said predetermined position at a slow rate and means responsive to the rate of returning said displaceable means to said predetermined position for selectively rendering one of said returning means ineffective.

14. A variable speed sensor for control conditions comprising a device responsive by movement for detecting a change in control condition, signal means associated with said detecting device for producing a signal of a phase and a magnitude dependent upon the direction and extent of movement of said detecting device, plural driving means responsive to the output signal of said signal means for driving said signal means to a null position, one of said driving means being adapted to drive said signal means for low rates of movement, the other of said driving means being adapted to drive said signal means at high rates of movement, means responsive to a predetermined rate of movement to disconnect said first named driving means from said signal means, and means responsive to the combined rates of said driving means to derive a signal proportional to the speeds of said driving means.

CORLES M. PERKINS.

References Cited in the file of this patent
UNITED STATES PATENTS

| Number | Name | Date |
| --- | --- | --- |
| 1,768,966 | Tanner | July 1, 1930 |
| 1,997,412 | Fischel | Apr. 9, 1935 |
| 2,105,598 | Hubbard | Jan. 18, 1938 |
| 2,419,812 | Bedford | Apr. 29, 1947 |
| 2,486,935 | Fanta, Jr. | Nov. 1, 1949 |